United States Patent [19]

Canfield et al.

[11] 4,345,106

[45] Aug. 17, 1982

[54] METHOD OF AND APPARATUS FOR DETECTING THE LEVEL OF MOLTEN GLASS IN A GLASS MELTING FURNACE

[75] Inventors: Sheldon A. Canfield, Newark; Paul S. Sanik, Westerville, both of Ohio

[73] Assignee: Owens-Corning Fiberglas Corporation, Toledo, Ohio

[21] Appl. No.: 194,481

[22] Filed: Oct. 6, 1980

[51] Int. Cl.³ .............................................. C03B 5/02
[52] U.S. Cl. ....................................... 373/27; 65/161; 73/290 R
[58] Field of Search ............... 13/6; 367/908; 340/612, 340/618; 65/161, DIG. 4, DIG. 13; 73/290 R

[56] References Cited

U.S. PATENT DOCUMENTS 4,194,077  3/1980  Canfield et al. .......................... 13/6
4,210,023  7/1980  Sakamoto et al. ................. 73/290 R

*Primary Examiner*—Roy N. Envall, Jr.
*Attorney, Agent, or Firm*—Ronald C. Hudgens; Patrick P. Pacella; Paul T. Kashimba

[57] ABSTRACT

A method of and apparatus for detecting the level of molten glass in a glass melting furnace comprising transmitting an electromagnetic wave towards the surface of the molten glass, detecting the electromagnetic wave reflected from the surface of the molten glass, determining the amount of time elapsed from the transmission of the electromagnetic wave to the detection of the reflected electromagnetic wave, and generating a signal responsive to the amount of elapsed time as an indication of the level of molten glass in the furnace.

7 Claims, 1 Drawing Figure

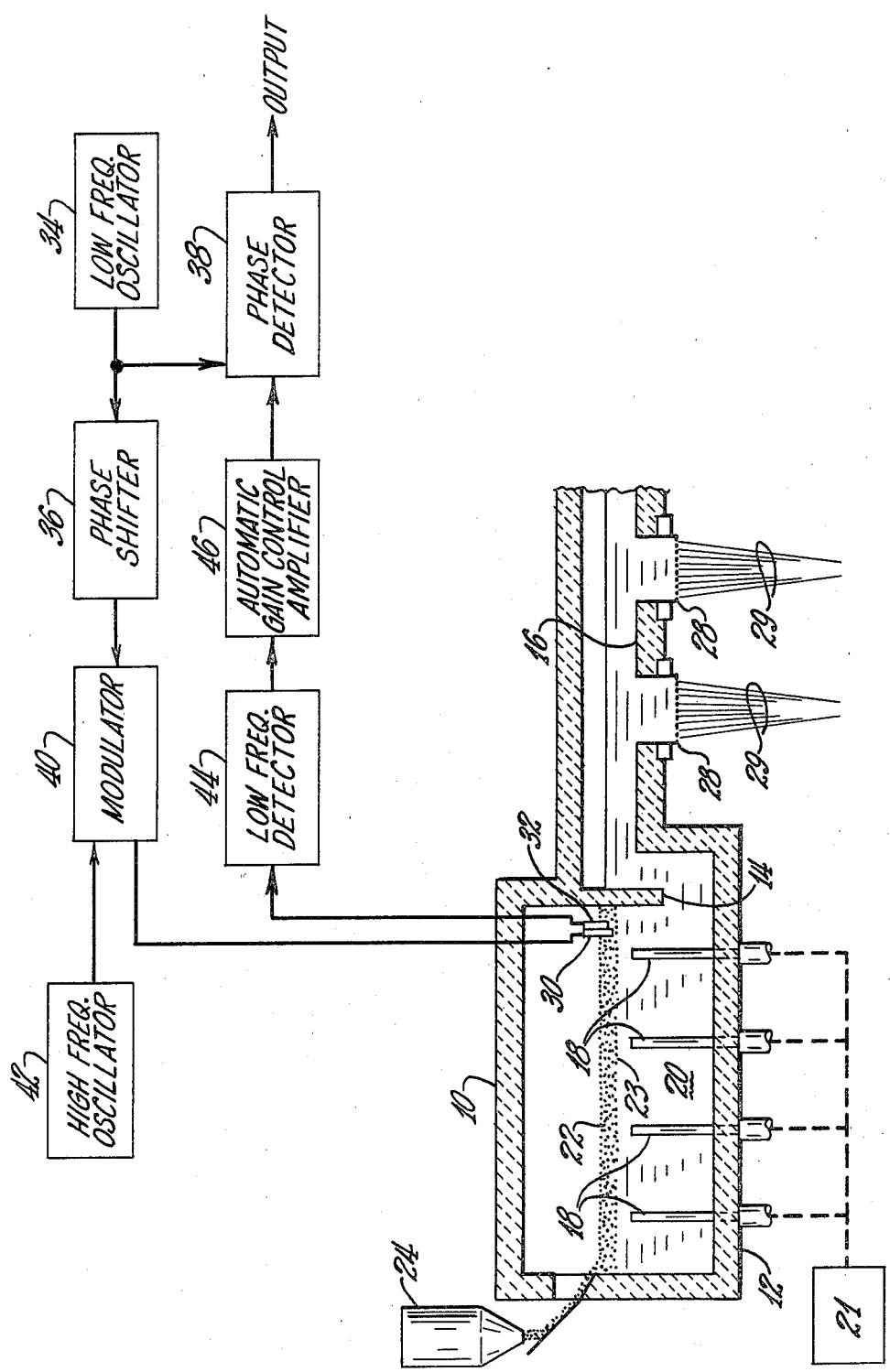

METHOD OF AND APPARATUS FOR DETECTING THE LEVEL OF MOLTEN GLASS IN A GLASS MELTING FURNACE

BACKGROUND OF THE INVENTION

This invention relates to the production of glass fibers, e.g., fibers made by melting particulate batch ingredients or minerals, including basalt and the like, and, more particularly, to a method of and apparatus for detecting the level of molten glass in a glass melting furnace.

In the production of glass, it is desirable to maintain a substantially constant head or level of molten glass in the melting furnace to reduce the erosion of the refractory and to provide a constant glass feed to the bushings. The prior art has employed bubbler systems, such as those disclosed in Trethewey, U.S. Pat. No. 3,200,971, to detect the level of molten glass in the furnace. However, such systems are not suitable for electric furnaces that have a layer of batch material on the surface of the molten glass, because the bubbles may disturb the batch layer and/or become trapped beneath the bottom of the batch layer and the top surface of molten glass thereby making the dividing line therebetween indistinct.

Canfield et al., U.S. Pat. No. 4,194,077, provides a method of approximating the level of molten glass in the furnace by measuring the thickness of the batch layer and then subtracting the batch thickness from the level of the batch layer in the tank. However, such method does not directly measure the level of the glass. An ultrasonic sensor detects the level of the batch layer, and a bubbler system detects the level of molten glass in the forehearth of the furnace; this data is then incorporated along with the density of the glass and density of the batch into a formula to calculate the thickness of the batch layer. This thickness is then subtracted from the level of the batch layer detected by the ultrasonic sensor to provide an approximation of the level of molten glass in the furnace.

Therefore, it is an object of the present invention to provide a method of and apparatus for directly detecting the level of molten glass in a furnace having a layer of batch material on the surface of the molten glass.

SUMMARY OF THE INVENTION

In accordance with the present invention, there is provided a method of detecting the level of molten glass in an electric furnace. The method comprises the steps of transmitting an electromagnetic wave towards the surface of the molten glass, detecting the electromagnetic wave reflected from the surface of the molten glass, determining the amount of time elapsed from the transmission of the electromagnetic wave to the detection of the reflected electromagnetic wave, and generating a signal responsive to the amount of elapsed time as an indication of the level of molten glass in the furnace.

In addition, the present invention also provides an apparatus for detecting the level of molten glass in a glass melting furnace, such apparatus comprising: means for generating an electromagnetic wave; means for transmitting an electromagnetic wave, the transmitting means being associated with the generating means and positioned in the furnace such that it directs the electromagnetic wave towards the surface of the molten glass; means for collecting the electromagnetic wave reflected from the surface of the molten glass; means associated with the collecting means for detecting the collected electromagnetic wave; means associated with the generating means and the detecting means for determining the amount of time elapsed from the generation of the electromagnetic wave until the detection of the collected wave; and means for generating an electric signal responsive to the elapsed time as an indication of the level of molten glass in the furnace.

The system of the present invention provides a direct measurement of the glass level that is independent of the thickness of the batch layer. Electromagnetic energy, which is preferably a modulated microwave, is transmitted towards the surface of the molten glass through the batch material which is relatively transparent to electromagnetic energy. The batch material allows the wave to travel therethrough to the surface of the molten glass from which the wave is reflected, because molten glass is opaque to electromagnetic energy. Therefore, the distance from the source of the electromagnetic wave to the upper surface of the molten glass can be detected by measuring the amount of time elapsed from the transmission of the wave to the detection of the wave reflected from the surface of the molten glass. The amount of time that the wave travels through the apparatus of the system would remain constant, but the time required for the wave to travel to the surface of the molten glass would vary as a function of the level of the molten glass.

In the preferred embodiment of the present invention, the electromagnetic wave generating means and the electromagnetic wave receiving means are positioned in the layer of batch material such that the respective ends thereof that emit the electromagnetic wave and receive the reflected electromagnetic wave are always located in the batch material, thereby insuring that the electromagnetic wave travels through a medium, i.e., the batch material, having a uniform dielectric constant. If the electromagnetic wave generating and receiving means are positioned above the batch material, the wave would travel through the air above the batch layer and through the batch layer itself, each of which has a different dielectric constant. If the thickness of the batch crust varies, the accuracy of the measurement would be impaired, since the distance that the electromagnetic wave would have to travel through each medium would differ.

However, the present invention should not be thought of as being limited to a furnace which has a layer of batch material on the surface of the molten glass, since the subject invention also provides an accurate and reliable method of measuring the level of molten glass in combustion fired furnaces that do not have a layer of batch material on the surface of the molten glass. In addition, the present invention should not be thought of as being limited to the embodiment in which the electromagnetic wave generating means is positioned in the batch surface, since a signal indicative of the level of the molten glass will be obtained even if the electromagnetic energy is subjected to varying dielectric constants. However, it should be noted that such a system would not provide the accuracy and reliability of the preferred embodiment in which the electromagnetic wave generating means and receiving means are positioned in the batch material such that the wave emitting and wave receiving ends thereof are always in contact with the batch material.

Other objectives, advantages and applications of the present invention will be made apparent by the following detailed description of the preferred embodiment of the invention.

BRIEF DESCRIPTION OF THE DRAWINGS

The FIGURE is a partial schematic view in longitudinal cross section of an electrically operated, glass-melting furnace utilizing the present invention.

DETAILED DESCRIPTION OF THE PREFERRED EMBODIMENT

Referring to the FIGURE, a glass-melting furnace utilizing the present invention is indicated generally at numeral 10. Furnace 10 has a melting tank 12 from which glass is discharged past a skimmer block 14 to a discharge passage or forehearth 16. A plurality of electrodes 18 extend upwardly through the bottom of melting tank 12. Electrodes 18 are suitably positioned throughout tank 12 in a desired pattern, as is well known in the electrical furnace art, and are supplied with power from a controlled source of power designated generally by numeral 21.

The glass in tank 12 is melted by current flowing between electrodes 18 to form a pool 20 of molten glass. Batch material is provided to furnace 10 by any suitable means, which is indicated generally at 24, to provide a layer or crust 22 of batch material on the surface 23 of pool 20 so that batch layer 22 replenishes the molten glass of pool 20 that flows outwardly through forehearth 16. The molten glass of pool 20 flows under skimmer block 14 and along forehearth 16 to glass fiber production means, such as fiber forming bushings 28, from which glass fibers 29 are attenuated, as is known in the art.

Furnace 10 is illustrative of one type of furnace for melting glass which incorporates the glass level sensing apparatus of the present invention. Other types of furnaces can also utilize the present invention, for example, an electric arc melting furnace; therefore, the glass melting furnace described herein should be interpreted as exemplary and not in a limiting sense.

Transmitting waveguide 30 and receiving waveguide 32 are positioned in tank 12 such that the transmitting and receiving ends of the respective waveguides are always located in batch layer 22. Low frequency oscillator 34 provides a low frequency signal, for example, 60 megahertz, to phase shifter 36 and phase detector 38. The phase shifted wave is then provided to modulator 40 along with a high frequency wave, for example, 10 gigahertz, from high frequency oscillator 42. Modulator 40 then modulates the amplitude of the high frequency carrier signal as a function of the phase shifted low frequency signal and provides the amplitude modulated signal (AM signal) to transmission waveguide 30. The AM wave is emitted from transmitting waveguide 30 and travels through the layer of batch material 22 to the surface 23 of molten glass from which it is reflected. To optimize the power transfer, a tapered ceramic section, constituting the window of the waveguide, may be utilized to provide a good impedance match to the batch. Such window also ensures the location of the batch in relation to the waveguide termination.

Receiving wave guide 32 collects the reflected AM wave and provides it to low frequency detector 44 which demodulates the AM wave to obtain the phase shifted low frequency signal. This low frequency phase shifted signal is then provided to automatic gain control amplifier 46 for suitable amplification to eliminate the effects of component environmental sensitivities. The amplified wave is then provided to phase detector 38 wherein its time position with respect to the low frequency signal provided by low frequency oscillator 34 is determined.

The variation in the path length from wave guides 30 and 32 to the surface 23 of the molten glass is the only time variable present in the system. Therefore, the phase shift detected by phase detector 38 is a function of the level of the molten glass in tank 12. The output signal from phase detector 38 which is indicative of the level of molten glass in the furnace is suitable for monitoring and/or control purposes as is known in the art.

If desired, but not preferred, a single wave guide in combination with a circulator may be employed to transmit the electromagnetic wave and collect the reflected electromagnetic wave. In addition, it should be noted that although amplitude modulation has been described herein any type of modulation may be employed. Still further, it should be noted that although the system has been described as utilizing a modulated microwave, any electromagnetic energy may be employed with or without a modulating signal.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

We claim:

1. A method of detecting the level of molten glass in a furnace having a layer of batch material on the surface of the molten glass comprising the steps of:
   a. generating a first electromagnetic wave signal of a known frequency;
   b. phase shifting this first electromagnetic wave signal;
   c. generating a second electromagnetic wave signal of a frequency higher than the first electromagnetic wave signal;
   d. amplitude modulating the second electromagnetic wave signal with the phase shifted first electromagnetic wave signal;
   e. transmitting the amplitude modulated second electromagnetic wave signal through the batch material to the molten glass;
   f. reflecting the amplitude modulated second electromagnetic wave signal from the surface of the molten glass;
   g. demodulating the reflected amplitude modulated second electromagnetic wave signal to produce a third electromagnetic wave signal which is the same frequency as the first electromagnetic wave signal;
   h. amplifying this third electromagnetic wave signal;
   i. comparing the phase shift or time position of the amplified third electromagnetic wave signal with that of the first electromagnetic wave signal; and
   j. generating an output signal in response to this phase shift which is indicative of the level of molten glass in the furnace.

2. A method as recited in claim 1 including the step of positioning a transmission wave guide and a receiving wave guide in the layer of batch material such that the respective ends thereof that transmit the amplitude modulated second electromagnetic wave signal and receive the reflected amplitude modulated second electromagnetic wave signal are always located in the batch material.

3. A method as recited in claim 1, wherein the first electromagnetic wave signal has a frequency of about 60 MHZ and the second electromagnetic wave signal has a frequency of about 10 GHZ.

4. An apparatus for detecting the level of molten glass in a furnace having a layer of batch material on the surface of the molten glass, the apparatus comprising:
   a. an oscillator means for generating a first electromagnetic wave signal of a known frequency;
   b. a phase shifter to control the initial phase angle of the first electromagnetic wave signal;
   c. an oscillator means for generating a second electromagnetic wave signal whose frequency is higher than the first electromagnetic wave signal;
   d. a modulator for amplitude modulating the second electromagnetic wave signal with the first electromagnetic wave signal received from the phase shifter;
   e. a transmission wave guide for transmitting the amplitude modulated second electromagnetic wave signal through batch material to the surface of the molten glass in the furnace;
   f. a receiving wave guide for receiving the reflected amplitude modulated second electromagnetic wave signal from the surface of the glass;
   g. a low frequency detector which receives the reflected amplitude modulated second electromagnetic wave signal and demodulates this signal by removing the second electromagnetic wave signal producing a third electromagnetic wave signal which is the same frequency as the first electromagnetic wave signal;
   h. an automatic gain control amplifier for amplifying this third electromagnetic wave signal; and
   i. a phase detector which determines the phase shift or time position difference between the first electromagnetic wave signal and the third electromagnetic wave signal and generates an output signal in response to this phase shift which is an indication of the level of the molten glass in the furnace.

5. An apparatus as recited in claim 4, wherein the transmission wave guide which transmits the amplitude modulated second electromagnetic wave signal and the receiving wave guide which receives the reflected amplitude modulated second electromagnetic wave signal are positioned in the layer of batch material such that the end of the transmission wave guide and the receiving wave guide are always located in the batch material.

6. An apparatus as recited in claim 4, wherein the oscillator means for generating the first electromagnetic wave signal produces an electromagnetic wave signal of about 60 MHZ and the oscillator means for producing the second electromagnetic wave signal produces an electromagnetic wave signal which has a frequency of about 10 GHZ.

7. An apparatus as recited in claim 4, wherein the transmission wave guide has a tapered ceramic section which constitutes the window of the wave guide.

* * * * *